INVENTOR
JACQUES RENAUDIE
BY
H. Hume Mathews
ATTORNEY

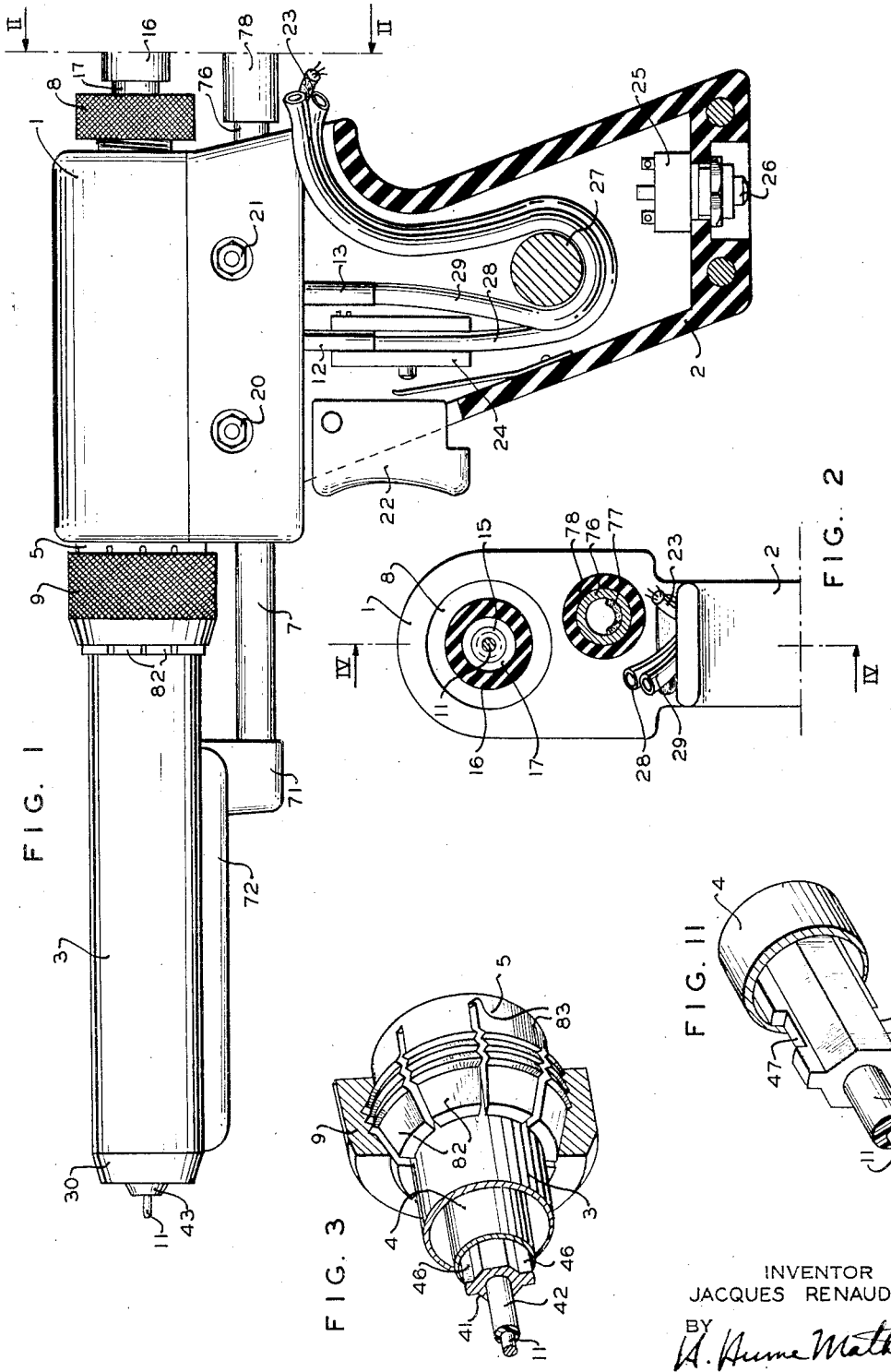

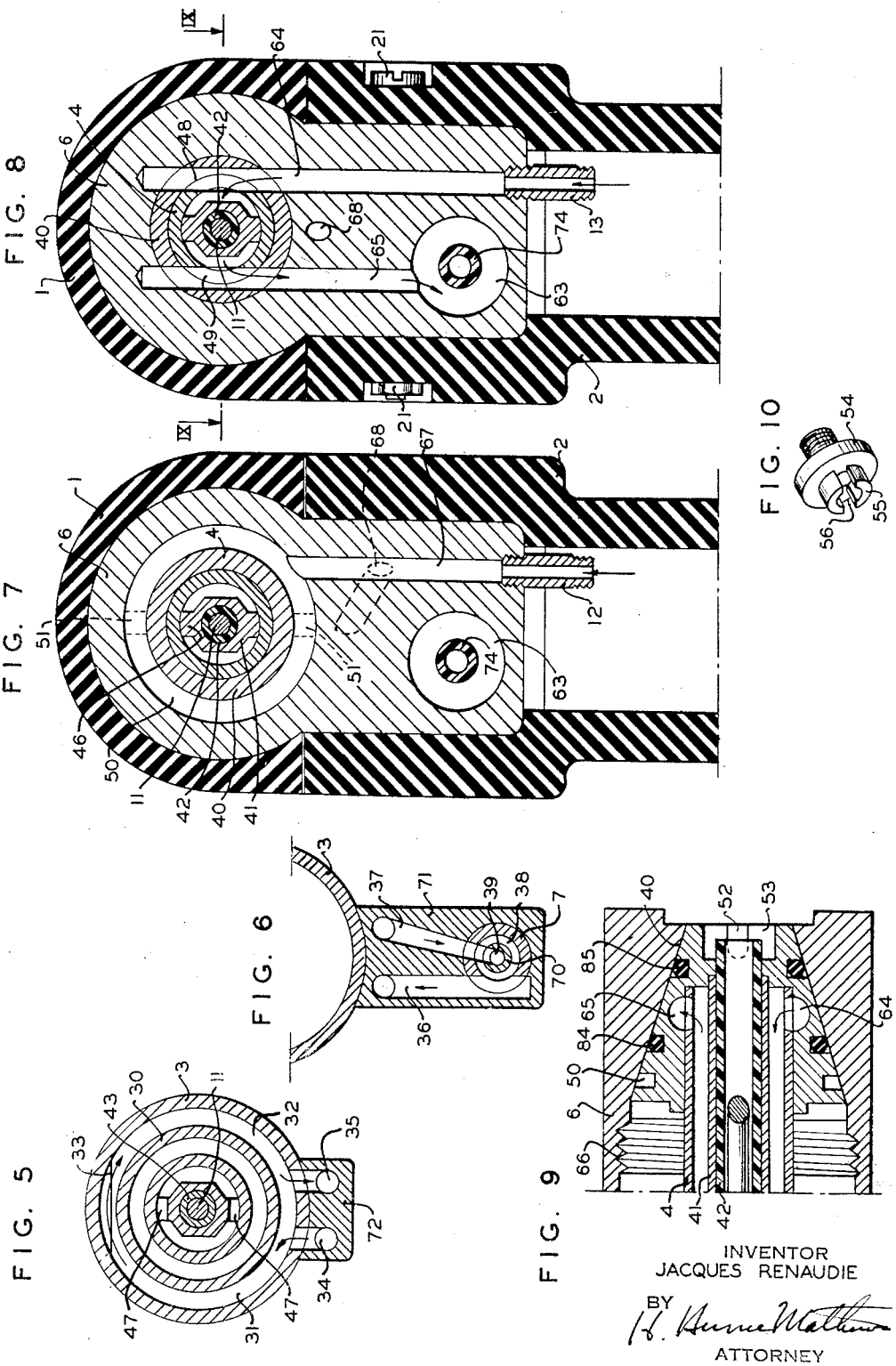

United States Patent Office 2,768,280
Patented Oct. 23, 1956

2,768,280

GAS SHIELDED ARC WELDING GUN WITH CONSUMABLE ELECTRODE WIRE

Jacques Renaudie, Boulogne-sur-Seine, France, assignor to L'Air Liquide, Societe Anonyme pour l'Etude et l'Exploitation des Procedes Georges Claude, Paris, France Application February 15, 1955, Serial No. 488,290

Claims priority, application France February 18, 1954

14 Claims. (Cl. 219—75)

This application relates to welding guns for gas shielded electric arc welding in which an arc is maintained inside an argon or the like protective atmosphere between a consumable electrode and the work, and it relates more particularly to a gun of the type wherein the cooling water flows in succession over the output nozzle of the consumable electrode and over the output nozzle for the protecting gas, which latter nozzle is located on the outside of the electrode nozzle and coaxially with reference to the latter.

Guns of this general type are well-known, wherein the flow of water is designed in a manner such that the outer nozzle may slide longitudinally with reference to the electrode nozzle without it being necessary to cut off the flow of cooling water. This arrangement furthers to a considerable extent the adjustment of the relative longitudinal position of the nozzles in accordance with the requirements of operation, for instance in accordance with the intensity of the welding current to be used, or again when it is necessary to make the outer nozzle recede slightly so that the weld may be performed within a narrow space.

My invention has for its object improvements in guns of this type, chiefly with a view to making its manufacture cheaper and simpler and its upkeep easier.

It has for its chief object an improvement and a simplification of the electric insulation of all the parts of the gun which do not require being fed with current. This insulation is a particularly difficult matter in the case of a gun having an outer nozzle adapted to slide without this requiring a stoppage of the water flow and hitherto it has been necessary to resort to a multiplicity of covers of insulating material surrounding the main component parts of the gun. Although my invention is of particular advantage for solving this problem of the insulation in guns of the type referred to, my said invention is also advantageously applicable to electric welding guns of any type, considered generally, as will appear from the reading of the following description.

A gas shielded arc welding gun according to my invention shows the following advantageous features:

(a) The body of the gun is made of a single part of insulating material and the tube connecting said body with the shielding gas output nozzle is entirely made of metal.

(b) The securing inside the gun of the tube referred to at (a) is obtained through the agency of a sleeve anchored preferably in the molding inside the insulating material of the body, said anchored socket being provided with means for clamping it over said tube.

(c) A recessed metal block is embedded inside the rear section of the insulating gun body and it is provided in succession from the front to the rear with a tapped cylindrical bore and with a smooth frusto-conical bore, the tapped bore having a maximum diameter which is less than the diameter of the bore of the sleeve clamping the nozzle carrying tube and than the diameter of the bore of the section of the insulating body fitted between said sleeve and said block.

(d) Inside the frusto-conical bore of the metal block referred to at (c) is fitted a frusto-conical member inside which are secured axially through one of their ends, two coaxial tubes, the other ends of which are secured together by a ring carrying the output nozzle for the electrode wire.

(e) The frusto-conical member referred to at (d) has a maximum diameter which is less than the minimum diameter of the tapped bore in the metal block, so that it may pass freely through said bore at the moment of the dismantling of the gun and it is held inside the cooperating frusto-conical bore or recess in the block by a threaded plug screwed into said tapped bore.

(f) The plug according to (e) is bored so as to form an annular passageway for the argon round the tubes entering the cone and it is provided in its section which is the nearest to the cone with radial ports through which said annular passageway communicates with a chamber defined between said plug and said cone, further passageways formed in the larger base of the frusto-conical member opening into said chamber.

(g) The frusto-conical member refered to at (d) is provided near each base with passageways for the flow therethrough of the argon while its central section is provided with passageways for the cooling water, the fluidtightness between the groups of passageways being ensured by two toreshaped packings housed inside annular grooves formed on the surface of the frusto-conical member to either side of the water passageways.

(h) Inside the gun handle is provided a boss round which the yielding pipes feeding water and argon are wound so that any fractional stress which may be exerted on said pipes is absorbed by said boss whereby the pipes cannot be torn off their connections with the gun.

(i) In the case where the cable feeding electric current passes in accordance with an already known arrangement inside the yielding water-returning pipe, said yielding pipe is connected with the recessed metal block mentioned at (c) by means of a metal connection to which the electric cable is secure, said connection being screwed into the block, and inside the bore thereof is slidingly fitted a tube made of insulating material which is screwed to the end of a metal tube so as to close the end of an annular channel formed between said metal pipe and a second metal pipe coaxial with the latter.

(j) In the front section of the gun body is anchored a stuffing box ring inside which may slide a tubular element parallel with the nozzle-carrying tube so as to serve for the flow of water towards and away from the argon output nozzle.

(k) The longitudinal partitioning of the flow of water, towards and away from the output nozzle for the electrode wire, is constituted by the fitting of a tube having a square outer cross-section inside a tube having a circular cross-section.

(l) The output nozzle for the argon is disconnectable and for this purpose it is fitted frictionally in position and the fluidtightness of the flow of water is ensured by tore-shaped packings.

Lastly, other features of the invention will appear to the reader of the following description, reference being made to accompanying drawings given by way of exemplification and by no means in a limiting sense. In the said drawings:

Fig. 1 is an elevational view of a gun according to my invention, the handle of which is shown in part sectional view.

Fig. 2 is a rear view of the same gun.

Fig. 3 is a perspective view, partly sectional, through line III—III of Fig. 4.

Fig. 5 is a transverse cross-section of the gun through line V—V of Fig. 4.

Fig. 6 is a transverse cross-section through line VI—VI of Fig. 4.

Fig. 7 is a cross section through line VII—VII of Fig. 4.

Fig. 8 is a transverse cross-section through line VIII—VIII of Fig. 4.

Fig. 9 is a partial longitudinal cross-section in a horizontal diametrical plane of the central section of the gun shown in elevational view in Fig. 4, the cross-section being executed through line IX—IX of Fig. 8.

Fig. 10 is a perspective view of the insulating end-piece provided on the yielding sheath enclosing the electrode wire, said end-piece being illustrated at 54 in Fig. 4.

Fig. 11 is a perspective view of a modified embodiment of the longitudinal partitioning of the tube feeding the water which is to cool the output nozzle for the electrode wire.

Figure 4:
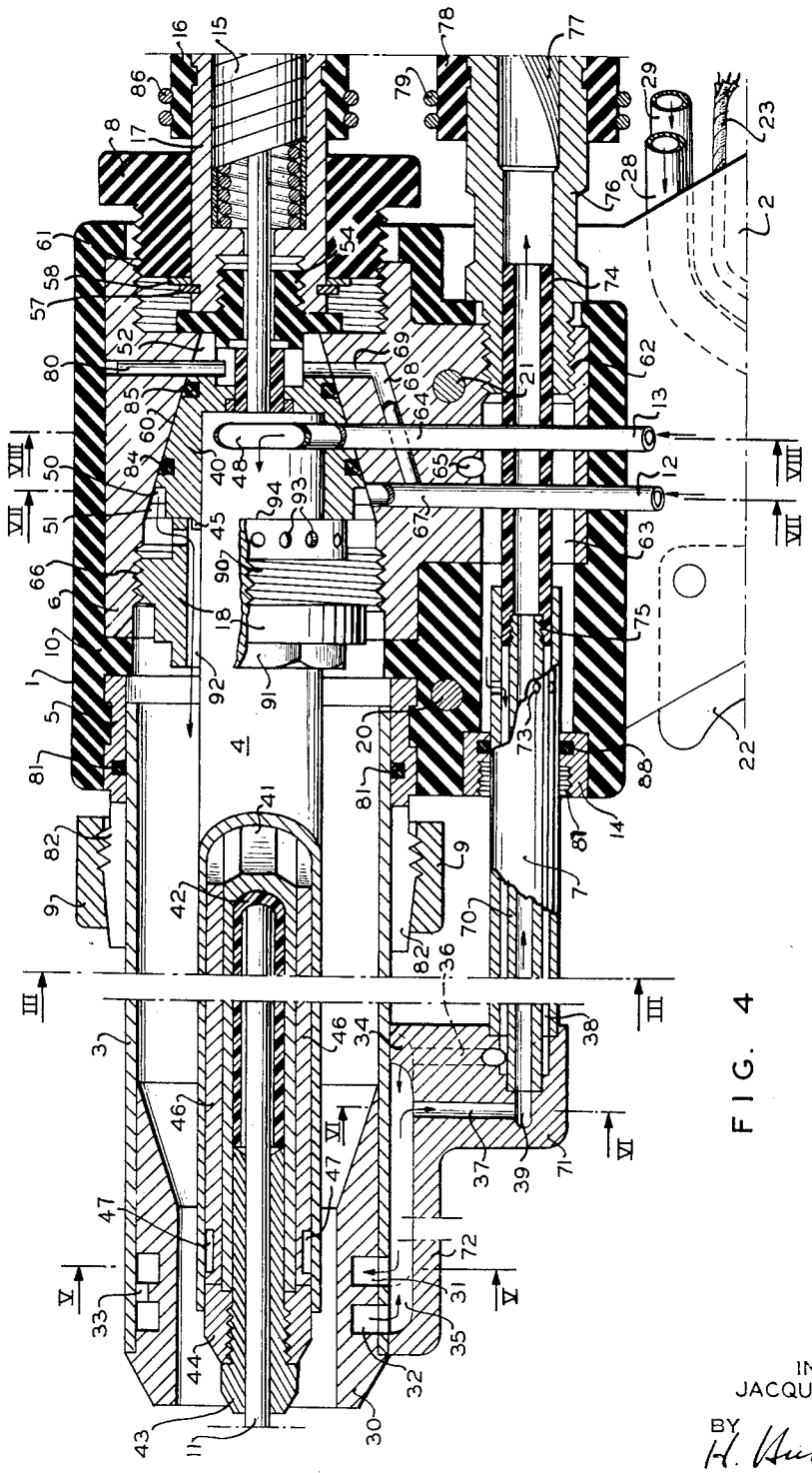
Fig. 4 is a longitudinal vertical sectional view of the gun shown in Fig. 1, certain details being shown on an enlarged scale.

Fig. 1 shows the outer appearance of the gun, the rear part of which is constituted by the body 1 and the handle 2, which body and handle are both made of molded insulating material. The material forming the body 1 may, for instance and preferably, be constituted by a synthetic polyester resin which is molded at room temperature and inside which are fitted previously machined metal elements which are held during the molding procedure in their final location.

The front end of the body 1 extends in the shape of a metal tube 3 the front end of which carries an argon-projecting nozzle 30.

The tube is made preferably of chromium-coated brass while the nozzle which is made of red copper is either soldered by means of tin solder to the tube or is fitted frictionally thereon so that it may be readily disconnected, the fluid-tightness of the flow of water inside the nozzle being in this case ensured by toroidal (O-ring) packings; the selection of either of these manners of mounting the nozzle depends on the applications to be considered. Axially of the outer tube 3 is housed an inner tube 4 which is clearly apparent in Figs. 3 to 5 and 7 to 9. Said tube 4 which is intended for the guiding of the electrode wire terminates at its front end with a nozzle 43 made of red copper, which serves as a contact-piece for feeding the welding current to the electrode 11 at the output end of the gun.

The outer tube 3 is fitted inside the body 1 with the interposition of a sleeve 5. The details of said slotted sleeve provided with coaxial clamping means are clearly apparent in Fig. 3.

The base of said sleeve is embedded inside the insulating material forming the gun body 1 inside which are also embedded the rear metal block 6 shown in Fig. 4 and the ring 14 which is also shown in Fig. 3 and the part played by which will be disclosed hereinafter.

The sleeve 5 is electrically insulated with reference to the block 6 by means of an annular shoulder 10 of insulating material molded in one with the body 1. Said annular shoulder projects slightly into the bore of the body to the rear of the sleeve 5, whereby it acts as a stop limiting the inward movement of the tube 3 inside the gun body. In the bore of the sleeve 5 is formed an annular groove inside which is fitted a toroidal (O-ring) packing 81.

The tube 3 may slide freely inside the sleeve 5 and it may, if required, be held fast in the latter by means of a flanged nut 9 screwed over the sleeve 5, which latter is provided with axial slots 83, Fig. 3, defining between them elastic jaws 82 adapted to be clamped over the tube 3 by a screwing down of the flanged nut 9 as shown in particular in Fig. 3.

Turning to Figs. 4 and 9, it is apparent that the rear metal block 6 is provided in succession along the same axis in a front to rear direction a first tapped bore 66, a frusto-conical bore 60 and a second tapped bore 61.

Inside the frusto-conical bore 60 is fitted a metal frusto-conical member 40 forming an end-piece for the tube 4 at the rear end of the latter, whereby said tube is accurately centered inside the body of the gun. Said frusto-conical member may be held inside the bore or recess 60 by means of a threaded plug 18 screwed into the first tapped bore 66 of the block 6. Said plug which plays also the part of a gas diffusing member as described hereinafter centrally engages a cylindrical shoulder 45 formed on the front end or large base of the frusto-conical member 40.

Referring more particularly to Fig. 9, it will be seen that the rear end of the tube 4 engages the inside of the frusto-conical member 40 and it is secured thereto for instance through soldering. Inwardly of the tube 4, a coaxial tube 41 is also secured endwise inside the cone 40. The inner surface of said tube 41 is lined by an insulating tube 42 which projects by a few millimeters beyond the rear end of the tube 41 while its front end abuts against the wire-guiding nozzle 43. The tube 41 carries two longitudinal fins 46 shown sectionally in Figs. 7 and 8, which subdivide into two halves the annular passageway comprised between the tube 4 and the tube 41. The two semi-annular passageways thus defined serve respectively for leading the cooling water into proximity with the wire-guiding nozzle 43 and for returning said water towards the rear end of the gun.

At their front ends, the two semi-annular passageways are closed by a cylindrical ring 44 welded both to the tube 4 and to the tube 41 and inside which is screwed the nozzle 43. To provide a circuit for the flow of water, the rear block 6 is provided with two transverse ducts 64 and 65 (Fig. 8) extending also through the frusto-conical member 40 and through the tube 4 so as to open into the latter through the tangential cuts 48 and 49 shown in projection in Fig. 9; the cut 48 on the left hand side corresponding to the admission of water is alone visible in elevational view in Fig. 4.

In a modification which makes the machining of the tube 41 simpler, said tube is constituted by an outwardly square sectioned tubular element fitted with a force fit inside the tube 4 as illustrated in Fig. 11, so as to form the longitudinal partitioning provided for the flow of water cooling the output nozzle of the electrode wire.

The water entering the tube 4 through the tubular connection 13, the duct 64 and the cut 48 flows inside the corresponding semi-annular passageways towards the nozzle 43 and when it reaches the vicinity of the latter, it passes through two notches 47 provided in the radial fins 46 as clearly shown in Figs. 4 and 5; the water enters then the second semi-annular passageway in the tube 4 which lies to the rear of the plane of Fig. 4 and returns towards the cut 49, opening into the transverse duct 65 which is visible in elevational view in Fig. 8 and as a projection in Fig. 9, said transverse duct opening tangentially as illustrated at 65 in Fig. 4 into a longitudinal channel 63 formed in the block 6.

Said channel 63, which is parallel with the axis of the tubes 3 and 4, opens axially towards the rear of the gun into a threaded bore 62 inside which is screwed a tubular metal connection 76. Inside said tubular connection is soldered the end of a yielding metal cable 77 feeding the current to the electrode wire through the agency of the block 6, of the frusto-conical member 40, of the tube 4 and of the inner nozzle 43. Over said tubular connection 76 is fitted an insulating yielding tube 78 held in position by a suitable binding 79. According to an arangement already known per se, said yielding tube 78 serves both as an insulating sheath for the cable and as a water returning tube wherethrough the cable is cooled by the water returning from the gun.

There is also provided axially of the channel 63 towards the front end thereof, a ring 14 already referred to as embedded inside the plastic material forming the body 1. Inside the opening of said ring, a tube 7, which is parallel with the tube 3 is adapted to slide. Said tube 7 extends at its forward end in the direction of the outer nozzle 30 in the shape of a twice bent hollow member 71 opening into a further member 72 extending along the nozzle-carrying tube 3 into the vicinity of the outer nozzle 30. Thus the tube 7 may slide in unison with the tube 3 so as to make the outer nozzle 30 advance or recede with reference to the inner nozzle 43 without it being necessary to cut off the flow of water through said outer nozzle.

The fluid tightness of the tube 7 as is passes through the ring 14 is ensured by a tore-shaped packing 88 housed inside an annular groove formed inside the opening of the ring 14. Said opening is provided with an enlarged tapped front section 87 inside which may be screwed a closing plug which is not illustrated and which serves when it is desired to remove the tube 7 so as to use the gun without resorting to any water cooling for the outer nozzle 30 or else said tapped front section may carry a hollow bolt surrounding the tube 7 and to which may be secured a railing or a guard which is not illustrated and which is intended to protect the hand of the operator.

A tube 70 extends coaxially inside the tube 7 and to the rear end of said tube 70 is screwed a tube 74 of an insulating material such as the synthetic material known as "nylon." Said tube 74 is gauged so as to close the rear end of the annular channel 38 comprised between the tubes 7 and 70 and it is adapted to slide with slight friction inside the bore formed in the tubular cable-carrying connection 76, in unison with the tubes 7 and 70, and for the purpose it is screwed at 75 over the rear end of the inner tube 70.

The annular channel 38 communicates with the channel 63 in the block 6, into which the water returning from the inner nozzle 43 is admitted, through radial perforations 73 formed in the tube 7 near the rear end of the latter. The tubes 7 and 70 are soldered at their front ends inside the doubly bent member 71 and member 72 which latter is in its turn soldered to the outside of the nozzle carrying tube 3. The tube 70 enters the member 71 to a more considerable extent than the tube 7, so that tube 70 opens axially into a channel 39 formed in said member 71, which channel opens in its turn inside a transverse channel or passageway 37; on the other hand the annular channel 38 surrounding the tube 70 and extending inside said member 71 to the rear of the channel 39 communicates with a transverse channel or passageway 36 through a tangential cut clearly shown in Fig. 6.

The transverse channels or passageways 36 and 37 open respectively at their other ends into two longitudinal channels 34 and 35 extending through the member 72, as clearly apparent in Figs. 4, 5 and 6 and said longitudinal channels in their turn open into two annular grooves 31 and 32 formed along the outer peripheral surface of the outer nozzle 30.

These two grooves 31 and 32 communicate with each other through a cut 33 whereby the water feeding the nozzle 30 through the annular groove 31 flows back through the other annular groove 32 and returns through the channels 35, 37 and 39 into the axial channel formed by the insulating tube 74 wherethrough the water is finally returned into the yielding pipe 78.

The argon is fed into the gun by the yielding tube 28 connected with a further tubular connection 12 which opens in its turn into a channel 67 formed in the block 6. Said channel 67 opens into an annular groove 50 formed peripherally of the frusto-conical member 40 in the vicinity of its larger base.

The front wall of said groove is cut through so as to form two diametrically opposed notches 51 through which the argon enters the annular recess formed between the diffuser or plug 18 and the frusto-conical member 40 (Fig. 7). The bore 92 in the diffuser 18 has a larger diameter than the tube 4 so as to form an annular passageway round the latter. Said passageway communicates with the notches 51 in the member 40 through a series of radial ports 93 which are twelve in number for instance and are formed in the rear section of the diffuser wall. The front end of the diffuser forms a six-sided member 91 wherethrough it may be held so as to be easily screwed into the block 6 through its thread 90. The shape of said diffuser ensures a very smooth flow of argon into the tube 3 and the nozzle 30.

The channel 67 feeding the argon opens into a shunt channel 68 extending obliquely towards the smaller base of the member 40 facing the rear end of the gun. Said oblique passageway opens inside a transverse channel 69 extending diametrically through the block 6, in the upper half of said transverse channel 69 is fitted a stud 80 which closes said channel and it engages a radial notch 52 cut in the smaller base of the member 40, as clearly shown in Figs. 4 and 9.

Said notch allows when the frusto-conical member 40 is fitted inside its recess 60 to angularly shift said member into a position such that the cuts 48 and 49 in the member 40 may register exactly with the water-feeding ducts 64 and 65.

The notch 52 allows furthermore a certain amount of argon to flow round the electrode wire 11, on the one hand, inside the insulating tube 42 lining the inside of the wire-guiding tube 41 and extending slightly to the rear of the latter and, on the other hand, inside the yielding insulating sheath 16 feeding the electrode wire to the gun. To this end, the sheath 16 which is inwardly reinforced by a spirally coiled wire 15 terminates with a tubular connection 17 inside which is welded or soldered the end of the spirally coiled wire 15 while the front of the insulating sheath 16 is bound as shown at 86 round said connection 17. On the side facing the gun, the connection 17 is provided with an insulating end-piece 54 which is axially bored. Said end-piece is shown in perspective view in Fig. 10. It is screwed inside the connection 17 and engages through a centering stud 55 formed on its front surface an axial recess 53 formed in the smaller base of the frusto-conical member 40 (Fig. 9). This stud 55 is fitted over the rear section of the insulating tube 42 enclosing the electrode wire; with a view to allowing the passage of a certain amount of argon into the yielding sheath 16 and to preventing any air from entering said sheath, the stud 55 is provided with a diametrical cut 56 forming a passageway for the argon out of the recess 53 fed by the transverse channel 69 towards the inside of the end-piece 54 and of the sheath 15—16, over the wire 11, whatever may be the angular location of said cut.

The end-piece 54 closes on the other hand the bottom of the tapped bore 61 at the rear end of the block 6 against which said end-piece is urged by the connection 17; the latter is held fast by a threaded insulating plug 8 screwed inside the tapped bore 61 in the block and abutting against a washer 58 threaded over said connection 17 and held in position in its turn by an elastic washer 57 fitted inside an annular groove in the tubular connection 17.

A particularly important problem which is met in the case of water-cooled electric apparatus resides in the necessity of cutting out the possibility of any water leaking out, chiefly in the case of arc-welding apparatus in which any entrance of water into the stream of protecting gas would detrimentally affect the grade of the weld.

Now, it has been mentioned hereinabove that the frusto-conical member 40 is provided in the vicinity of its two bases with openings for the passage of argon and in its medial section with water input and output openings. Fluid tightness between these two series of openings is ensured in a particularly simple and efficient manner by two toroidal packing rings 84 and 85 housed in annular grooves of the frusto-conical member 40 to either side of the openings or cuts 48 and 49 providing for the passage of water.

The handle 2 of my improved gun shows also certain novel features which are clearly apparent from inspection of Fig. 1. The body of the gun according to the invention being molded as a single part, in contradistinction with a number of prior known guns constituted by two separate shells, the said body of my improved gun is held by bolts 20 and 21 passing through it and which serve for the securing to said body of the two symmerical sections forming the handle 2.

Said handle encloses in the usual manner a trigger 22 controlling an electric switch 24 while a second switch 25 is housed inside the lower end of the handle and may be actuated through a knob 26 housed in the lower end of the handle for manual control at said lower end of the handle. These two switches 24 and 25 are connected by wires 23 enclosed inside a common sheath with a control box which is not illustrated since it does not form part of my invention.

On the other hand, I have provided a boss 27 inside the handle and the yielding argon feeding pipe 28 and the yielding water feeding pipe 29 which enter the upper rear end of the handle and open into the corresponding connections 12 and 13 on the gun body are coiled round the boss 27 so that any tractional stress to which said pipes may be submitted may be absorbed by the boss without it being transmitted to the ends of said yielding pipes engaging the tubular connections 12 and 13. This arrangement increases the reliability in operation of the gun and it is also applicable to the conductive wires 23 connecting the gun with the control box.

The gun according to my invention shows, as its chief advantages, a considerable simplification with reference to prior art together with an accurate automatic centering of the central tube by reason of its conical fitting which provides furhermore for an extremely easy dismantling, since the diffusor plug 18 is readily unscrewed by means of a conventional tubular wrench after withdrawal of the tubes 3 and 7 which are removed together after mere release of the flanged nut 9.

A particularly important advantage resides in the fact that it is sufficient to release the flanged nut 9 with reference to the sleeve 5 securing the nozzle-carrying tube 3 when it is desired to make the tube 3 and the water conveying tube 7 slide together inside the gun whereas in all prior apparatus it was necessary to shift said tubes separately, care being taken to hold them in parallelism and to prevent their wedging.

When using electrode wires of different diameters it is thus very easy to replace in a very short time, the central tube 4 with its frusto-conical member 40 by another tube carrying a similar frusto-conical member. It is also possible to unscrew the inner terminal nozzle 43 and to substitute for it a similar nozzle of a different bore, and also if required to replace the insulating tube 42 housed inside the central tube 41 to the rear of the nozzle 43.

It will also be apparent to anyone skilled in the art of electric welding apparatus that a number of improved arrangements incorporated into my improved gun may be used advantageously in other types of welding guns, such as those which use a non-consumable electrode.

What I claim is:

1. A welding gun for gas shielded electric arc welding comprising a hollow unitary insulating substantially cylindrical body, an electrode carrier rigid with said body and extending inside the latter and to the front thereof, a gas-feeding nozzle surrounding the front end of said electrode carrier with a gap therebetween, an entirely metallic tube carrying said nozzle, surrounding the electrode carrier, also with a gap therebetween, slidingly engaging the insulating body to allow its shifting longitudinally of said electrode carrier, means for feeding a protective gas into the gap between the electrode carrier on the one hand and said metal tube and the nozzle on the other hand and out of said nozzle, means for feeding cooling water to the electrode carrier, a member rigid with the nozzle, slidingly engaging the insulating body of the gun and including means for conducting the cooling water from said electrode carrier into heat exchange relation with the nozzle, and means for electrically energizing the electrode in the electrode carrier.

2. A welding gun for gas shielded electric arc welding comprising a hollow unitary insulating substantially cylindrical body, a cylindrical electrode carrier rigid with said body and extending inside said body and to the front thereof, a gas-feeding nozzle surrounding the front end of said electrode carrier with a gap therebetween, a sleeve anchored inside the inner surface of the front section of the insulating body, and surrounding coaxially the electrode carrier with a gap therebetween, a metal tube carrying the nozzle, slidingly fitted in contacting relationship inside and coaxially surrounding the electrode carrier with a gap therebetween, means for clamping the sleeve fast over the tube for any desired longitudinal position of said tube, means for feeding a protective gas into the gap between the electrode carrier and said metal tube and out of the nozzle, means for feeding cooling water to the electrode carrier, a member rigid with the gas nozzle slidingly engaging the insulating body of the gun and including conduit means for conducting cooling water in heat exchange relation with the gas nozzle, and means for electrically energizing the electrode in the electrode carrier.

3. A welding gun for gas shielded electric arc welding comprising a hollow unitary insulating substantially cylindrical body, a cylindrical electrode-carrier extending inside said body and to the front thereof, a gas-feeding nozzle surrounding the front end of said electrode carrier and defining a cylindrical gap therewith, a sleeve anchored inside the front section of the insulating body and surrounding coaxially and at a distance, the electrode carrier, a metal block embedded inside the rear section of the insulating body and provided in coaxial alingnment with the sleeve with a front tapped bore and with a smooth frusto-conical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, means for securing the electrode-carrier inside the bores of said block, a metal tube carrying at the front end thereof the gas nozzle and extending rearwardly into sliding contacting relationship with the inner surface of the sleeve, said tube coaxially surrounding the electrode carrier with a cylindrical gap between it and the latter, means adapted to clamp the sleeve fast over the metal tube for any desired longitudinal position of said metal tube, means adapted to feed a protective gas into the gap between the electrode carrier and said metal tube and out of the gas nozzle, means adapted to feed cooling water inside the electrode carrier, a member rigid with the gas nozzle slidingly engaging the insulating body of the gun and including conduit means for conducting cooling water in heat exchange relation with the gas nozzle and means adapted to electrically energize the electrode in the electrode carrier.

4. A welding gun for gas shielded electric arc welding, comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a front tapped bore and with a smooth frusto-conical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, a plug screwed into the tapped bore in the block and engaging the front end of the frusto-conical member, means adapted to feed a consumable wire electrode through the frusto-conical member, the inner coxial tube and the electrode nozzle, conduit means between the two coaxial tubes of the electrode carrier for conducting a flow of cooling water in heat exchange relation with the electrode nozzle, a metal tube carrying the gas nozzle at its front end and extending rearwardly into sliding contacting relationship with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, means adapted to feed a protective gas into the gap between the outer coaxial tube of the electrode carrier and said metal tube and out of the gas nozzle, a member rigid with the gas nozzle, slidingly engaging the insulating body of the gun and including conduit means for conducting cooling water in heat exchange relation with the gas nozzle and means adapted to electrically energize the electrode in the electrode carrier through the frusto-conical conductive member.

5. A welding gun for gas shielded electric arc welding comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with a front tapped bore and with a smooth frusto-conical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, the maximum diameter of said frusto-conical member being smaller than the minimum diameter of the tapped bore in the block to allow said member to freely pass through said tapped bore, a plug screwed into the tapped bore in the block and engaging the front end of the frusto-conical member, means adapted to feed a consumable wire electrode through the frusto-conical member, the inner coaxial tube and the electrode nozzle, conduit means between the two coaxial tubes of the electrode carrier for conducting a flow of cooling water in heat exchange relation with the electrode nozzle, a metal tube carrying the gas nozzle at its front end, and extending rearwardly into sliding contacting relationship with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, means adapted to feed a protective gas through the frusto-conical member and through the plug into the gap between the outer coaxial tube of the electrode carrier and said metal tube and out of the gas nozzle, a member rigid with the gas nozzle, slidingly engaging the insulating body of the gun and including conduit means for conducting cooling water in heat exchange relation with the gas nozzle, and means adapted to electrically energize the electrode in the electrode carrier through the frusto-conical conductive member.

6. A welding gun for gas shielded electric arc welding comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted inside said ring, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with a front tapped bore and with a smooth frusto-conical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, the maximum diameter of said frusto-conical member being smaller than the minimum diameter of the tapped bore in the block to allow said member to freely pass through said tapped bore, an annular plug screwed into the tapped bore of the block, the diameter of the bore of the plug being larger than the diameter of the outer coaxial tube of the electrode carrier to provide an annular passageway between the surface of said bore and the outer surface of said outer coaxial tube, said plug engaging the front surface of the frustoconical member in the vicinity of the bore in the plug, said plug leaving an annular space between it and said front surface of the frustoconical member on the inside of the block and being provided with radial ports connecting the last mentioned annular passageway at points near the frusto-conical member with the annular space separating the plug from the frusto-conical member, means adapted to feed a consumable wire electrode through the frusto-conical member, the inner coaxial tube and the electrode nozzle, conduit means between the two coaxial tubes of the electrode carrier for conducting a flow of cooling water in heat exchange relation with the electrode nozzle, a metal tube carrying the gas nozzle at its front end, and extending rearwardly into sliding contacting relationship with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, means extending through the frusto-conical member near the larger front base thereof and adapted to feed a protective gas through the annular space between the plug and the frusto-conical member and through the radial ports provided in the plug into the passageway between the plug and the outer coaxial tube, into the gap between the sliding metal tube and said outer coaxial tube and finally into the gas nozzle surrounding the electrode carrying nozzle, a member rigid with the gas nozzle, slidingly engaging the insulating body of the gun and including conduit means for conducting cooling water in heat exchange relation with the gas nozzle, and means adapted to electrically energize the electrode in the electrode carrier through the frusto-conical conductive member.

7. A welding gun for gas shielded electric arc welding comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a front tapped bore and with a smooth frusto-conical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, a plug screwed into the tapped bore in the block and engaging the front end of the frusto-conical member, means adapted to feed a consumable wire electrode through the frusto-conical member, the inner coaxial tube and the electrode nozzle, means for feeding a protective gas through the frustoconical member respectively near each end of said member, means feeding cooling water through the medial part of the frusto conical member into the annular passageway separating the two coaxial tubes, two toroidal packings fitted on the periphery of the frusto-conical member and engaging the corresponding frusto-conical surface of the second bore in the block to fluid tightly separate the water-feeding means from the gas-feeding means at either end of said frusto-conical member, conduit means between the two coaxial tubes of the electrode carrier and communicating with the water feeding means in the frustoconical member for conducting a flow of cooling water in heat exchange relation with the electrode nozzle, a metal tube carrying the gas nozzle at its front end, and extending rearwardly into sliding contacting relationship with the inner surface of the sleeve and coaxially surrounding the outer coaxial tube of the electrode carrier with a cylincylindrical gap between it and the latter, means adapted to clamp the sleeve fast over the metal tube for any desired longitudinal position of said metal tube, means through which the protective gas passing out of the means feeding it through the frustoconical member is fed over the wire electrode ahead of the frustoconical member and through the metal tube and gas nozzle surrounding the outer tube of the electrode carrier, a member rigid with the gas nozzle slidingly engaging the insulating body of the gun and including conduit means for conducting cooling water in heat exchange relation with the gas nozzle and means adapted to electrically energize the electrode in the electrode carrier through the frusto-conical conductive member.

8. A welding gun for gas shielded electric arc welding, comprising a hollow unitary insulating substantially cylindrical body, an electrode carrier rigid with said body and extending inside the latter and to the front thereof, a gas-feeding nozzle surrounding the front end of said electrode carrier with a gap therebetween, an entirely metallic tube carrying said nozzle, surrounding the electrode carrier, also with a gap therebetween, slidingly engaging the insulating body to allow its shifting longitudinally of said electrode carrier, means for feeding a protective gas into the gap between the electrode carrier on the one hand and said metal tube and the nozzle on the other hand and out of said nozzle, means for feeding cooling water to the electrode carrier, a member rigid with the nozzle, slidingly engaging the insulating body of the gun and including conduit means for conducting cooling water supplied from said water feeding means into heat exchange relation with the nozzle, means for electrically energizing the electrode in the electrode carrier, a hollow handle rigid with the rear end of the insulating body, a boss formed inside said handle and pipes feeding water and a protective gas respectively to the means feeding same and coiled round said boss to prevent transmission of any tractional stresses exerted on the pipes onto said last mentioned means.

9. A welding gun for gas shielded electric arc welding, comprising a hollow unitary insulating substantially cylindrical body, a cylindrical electrode-carrier extending inside said body and to the front thereof, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a front tapped bore and with a smooth frustoconical bore formed to the rear of the said front bore and tapering rearwardly towards the rear end of said block, the maximum diameter of the tapped bore being smaller than the inner diameter of the sleeve, said block being provided with an auxiliary longitudinal bore parallel with the axis of the first mentioned bores, extending throughout the block and tapped at its rear end, the lower solid section of the insulating body being provided with a bore aligned with the auxiliary bore in the block to make the latter communicate with the front of the insulating body, an inner collar of insulating material integrally formed with the insulating body of the gun and fitted between the front end of the block and the rear end of the sleeve, means for securing the electrode-carrier inside the first mentioned bore of said block, a metal tube carrying at its front end the gas nozzle, and extending rearwardly into sliding contacting relationship with the inner surface of the sleeve and coaxially surrounding the electrode carrier with a cylindrical gap between it and the latter, means adapted to clamp the sleeve fast over the metal tube for any desired longitudinal position of said metal tube, means adapted to feed a protective gas into the gap between the electrode carrier and said metal tube and out of the gas nozzle, means adapted to feed cooling water inside the electrode carrier, a yielding pipe adapted to collect the cooling water after it has cooled the electrode carrier, a cable feeding electric current, the end of which is carried inside said yielding water-collecting pipe, a metal connection screwed inside the rear tapped end of the auxiliary bore in the block and fitted in the yielding pipe through its rear end, a tube of insulating material slidingly fitted in the front end of the last mentioned connection, a threaded metal tube screwed into the front end of said insulating tube, a second metal tube fitted over the front end of the insulating tube, extending through the aligned bores in the block and body and provided with a plurality of radial perforations connecting the aligned bores outside said second last mentioned tube with the annular passageway defined between the latter and the inner threaded tube, the two last mentioned tubes sliding fluid tightly in unison with the insulating tube out of the front end of the aligned bores, a member rigidly connecting last mentioned sliding tubes with the first mentioned metal tube and gas nozzle thereon, and including a water circuit operatively connecting the inside of the threaded metal tube with the annular passageway surrounding the latter to feed cooling water to the gas nozzle, means connecting the output of the means feeding cooling water inside the electrode carrier with the aligned bores surrounding the system comprising the insulating tube and the coaxial last mentioned metal tubes, said aligned bores communicating through the perforations in the second last mentioned tube with the annular passageway between the two coaxial tubes carried inside the aligned bores, and means electrically connecting the electrode carried by the electrode carrier with the cable through the metal block.

10. A welding gun for gas shielded electric arc welding comprising a hollow unitary insulating substantially cylindrical body, a cylindrical electrode-carrier extending inside said body and to the front thereof, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided with a first bore coaxial with the sleeve and with an auxiliary longitudinal bore parallel with the axis of the first mentioned bore, extending throughout the block and tapped at its rear end, the lower solid section of the insulating body being provided with a bore aligned with the auxiliary bore in the block to make the latter communicate with the front of the insulating body, an inner collar of insulating material integrally formed with the insulating body of the gun and fitted between the front end of the block and the rear end of the sleeve, means for securing the electrode-carrier inside the first mentioned bore of said block, a metal tube carrying at its front end the gas nozzle, and extending rearwardly into sliding contacting relationship with the inner surface of the sleeve and coaxially surrounding the electrode carrier with a cylindrical gap between it and the latter, means adapted to clamp the sleeve fast over the metal tube for any desired longitudinal position of said metal tube, means adapted to feed a protective gas into the gap between the electrode carrier and said metal tube and out of the gas nozzle, means adapted to feed cooling water inside the electrode carrier, a yielding pipe adapted to collect the cooling water after it has cooled the electrode carrier, a cable feeding electric current, the end of which is carried inside said yielding water-collecting pipe, a metal connection screwed inside the rear tapped end of the auxiliary bore in the block and fitted in the yielding pipe through its rear end, a tube of insulating material slidingly fitted in the front end of last mentioned connection, a threaded metal tube screwed into the front end of said insulating tube, a second metal tube fitted over the front end of the insulating tube, extending through the aligned bores in the block and body and provided with a plurality of radial perforations connecting the aligned bores outside said second last mentioned tube, with the annular passageway defined between the latter and the inner threaded tube, a ring fitted inside the front end of the bore in the insulating body and provided with a bore inside which said last mentioned second metal tube is adapted to slide and a packing fitted inside said ring to fluid tightly hold said second tube slidingly engaging the ring, a member rigidly connecting said last mentioned sliding tubes with the first mentioned metal tube and the gas nozzle thereon and including a water circuit operatively connecting the inside of the threaded metal tube with the annular passageway surrounding the latter to feed cooling water to the gas nozzle, means connecting the output of the means feeding cooling water inside the electrode carrier with the aligned bores surrounding the system comprising the insulating tube and the coaxial last mentioned metal tubes, said aligned bores communicating through the perforations in the second last mentioned tube with the annular passageway between the two coaxial tubes carried inside the aligned bores, and means electrically connecting the electrode carried by the electrode carrier with the cable through the metal block.

11. A welding gun for gas shielded electric arc welding comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, radial fins provided on the inner coaxial tube in diametrically opposed relationship and separating the annular gap between the coaxial tubes into two semi-cylindrical passageways, said fins being provided with apertures at their front ends to ensure communication between the semi-cylindrical passageways, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a front tapped bore and with a smooth frustoconical bore formed to the rear of the said front bore and tapering rearwardly towards the rear end of said block, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, a plug screwed into the tapped bore in the block and engaging the front end of the frusto-conical member, means adapted to feed a consumable wire electrode through the frusto-conical member, the inner coaxial tube and the electrode nozzle, means adapted to produce a flow of cooling water for the electrode nozzle through the circuit, constituted by the semi-cylindrical passageways and apertures in the fins therebetween, between the two coaxial tubes of the electrode carrier, a metal tube carrying the gas nozzle at its front end, extending through its rear end in sliding contacting relationship with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, means adapted to feed a protective gas into the gap between the outer coaxial tube of the electrode carrier and said metal tube and out of the gas nozzle, a member rigid with the gas nozzle, slidingly engaging the insulating body of the gun and including conduit means for conducting cooling water in heat exchange relation with the gas nozzle and means adapted to electrically energize the electrode in the electrode carrier through the frustoconical conductive member.

12. A welding gun for gas shielded electric arc welding, comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, the inner tube having a substantially square outer cross-section defining with the inner surface of the outer tube a plurality of separate passageways, said inner tube being provided with transverse cuts along the ridges of its cross section towards the front ends thereof to provide communication between two successive passageways thus defined, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a front tapped bore and with a smooth frusto-conical bore formed to the rear of the said front, the maximum diameter of the tapped bore being smaller than the inner diameter of the sleeve, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, a plug screwed into the tapped bore in the block and engaging the front end of the frusto-conical member, means adapted to feed a consumable wire electrode through the frusto-conical member, the inner coaxial tube and the electrode nozzle, means adapted to produce a flow of cooling water for the electrode nozzle through the circuit constituted by the interconnected passageways between the coaxial tubes of the electrode carrier, a metal tube carrying the gas nozzle at its front end and extending rearwardly into sliding contacting relationship with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, means adapted to feed a protective gas into the gap between the outer coaxial tube of the electrode carrier and said metal tube and out of the gas nozzle, a member rigid with the gas nozzle, slidingly engaging the insulating body of the gun and including conduit means for conducting cooling water in heat exchange relation with the gas nozzle and means adapted to electrically energize the electrode in the electrode carrier through the frusto-conical conductive member.

13. A welding gun for gas shielded electric arc welding comprising a hollow unitary insulating substantially cylindrical body, an electrode carrier rigid with said body and extending inside the latter and to the front thereof, a gas-feeding nozzle surrounding the front end of said electrode carrier with a gap therebetween, an entirely metallic tube frictionally engaging the rear end of the nozzle, surrounding the electrode carrier with a gap therebetween, and longitudinally movable with respect to the insulating body to allow its shifting longitudinally of said electrode carrier, means for feeding a protective gas into the gap between the electrode carrier on the one hand and metal tube and the nozzle on the other hand and out of said nozzle, means for feeding cooling water to the electrode carrier, a member rigid with the nozzle, slidingly engaging the insulating body of the gun and including conduit means for conducting cooling water supplied from said water feeding means into heat exchange relation with the nozzle, toroidal packings carried at the periphery of the gas nozzle and engaging the metal tube to provide fluidtightness for the cooling water flowing through the nozzle and means for electrically energizing the electrode in the electrode carrier.

14. A welding gun for gas shielded electric arc welding, comprising a hollow unitary insulating substantially cylindrical body, a cylindrical electrode carrier extending inside said body and to the front thereof, and including two coaxial tubes, a ring fitted between the front ends of said coaxial tubes, an electrode nozzle fitted into said ring, a gas-feeding nozzle surrounding the front end of said electrode carrier and defining a cylindrical gap therewith, a sleeve anchored inside the front section of the insulating body and surrounding coaxially and at a distance the electrode carrier, a metal block embedded inside the rear section of the insulating body and provided in coaxial alignment with the sleeve with a smooth frusto-conical bore formed to the rear of the said front bore and tapering rearwardly towards the rear end of said block and with a rear tapped bore opening coaxially into the rear end of the frustoconical bore, an inner collar of insulating material integrally formed with the insulating body of the gun and fitted between the front end of the block and the rear end of the sleeve, a frusto-conical forwardly flaring electrically conductive member fitted inside the frusto-conical bore in the block and the front surface of which is provided with an axial recess inside which the tubes of the electrode carrier are coaxially fitted to project forwardly of the block, said axial recess extending into a coaxial perforation opening into the rear surface of the block, conduit means between the two coaxial tubes of the electrode carrier for conducting cooling water in heat exchange relation with the electrode nozzle, a metal tube carrying the gas nozzle at its front end and extending rearwardly into sliding contacting relationhip with the inner surface of the sleeve and coaxially surrounding the outer coaxial tube of the electrode carrier with a cylindrical gap between it and the latter, means adapted to clamp the sleeve fast over the metal tube for any desired longitudinal position of said metal tube, an insulating longitudinally perforated plug system screwed into the rear tapped bore of the block, a yielding sheath through which a consumable wire electrode is adapted to be fed through the perforation in the plug system, the perforation in the frustoconical member, the inner coaxial tube, and the electrode nozzle, means adapted to feed an inert gas over the wire electrode into the perforations in the plug system and into the yielding sheath on the one hand and on the other hand through the frustoconical member into the annular gap between the outer coaxial tube of the electrode carrier and said metal tube carrying the gas nozzle and out of the gas nozzle, a member rigid with the gas nozzle, slidingly engaging the insulating body of the gun and including conduit means for conducting cooling water in heat exchange relation with the gas nozzle, and means adapted to electrically energize the electrode in the electrode carrier through the frustoconical conductive member.

References Cited in the file of this patent

UNITED STATES PATENTS 2,550,495    Pilia    Apr. 24, 1951

FOREIGN PATENTS 713,507    Great Britain    Aug. 11, 1954